United States Patent [19]

Schirmer

[11] Patent Number: 4,496,516
[45] Date of Patent: Jan. 29, 1985

[54] PROCESS FOR FORMING ORIENTED MULTI-LAYER FILMS HAVING A DIFFERENT ORIENTATION DISTRIBUTION BETWEEN LAYERS

[75] Inventor: Henry G. Schirmer, Spartanburg, S.C.

[73] Assignee: W. R. Grace & Co., Cryovac Div., Duncan, S.C.

[21] Appl. No.: 488,944

[22] Filed: Apr. 27, 1983

Related U.S. Application Data

[62] Division of Ser. No. 406,590, Aug. 9, 1982, Pat. No. 4,442,147.

[51] Int. Cl.³ .............................................. B29D 7/24
[52] U.S. Cl. ............................... 264/514; 156/244.14; 264/564; 264/130; 264/173; 264/285; 425/133.1
[58] Field of Search ..................... 264/564, 567–568, 264/514, 515, 173, 512, 285, 130; 425/133.1; 156/244.14

[56] References Cited

U.S. PATENT DOCUMENTS

| 2,753,596 | 7/1956 | Bailey | 156/244.14 |
| 3,567,539 | 3/1971 | Schirmer | 156/244.14 |
| 3,712,847 | 1/1973 | Rasmussen | 161/55 |
| 3,726,743 | 4/1973 | Reifenhauser | 156/494 |
| 3,853,661 | 12/1974 | Sudo | 264/173 |
| 3,894,907 | 7/1975 | Sudo | 156/244.14 |
| 3,926,706 | 12/1975 | Reifenhauser | 156/229 |
| 3,949,042 | 4/1976 | Utz | 264/173 |
| 4,039,364 | 8/1977 | Rasmussen | 156/164 |
| 4,076,568 | 2/1978 | Kubat | 156/229 |
| 4,239,111 | 12/1980 | Conant | 206/484 |
| 4,358,330 | 11/1982 | Aronovici | 264/173 |

FOREIGN PATENT DOCUMENTS

52-9076  1/1977  Japan ................................ 264/173

*Primary Examiner*—Jeffery Thurlow
*Attorney, Agent, or Firm*—John J. Toney; William D. Lee, Jr.; Mark B. Quatt

[57] ABSTRACT

The invention comprises an oriented multi-layer film having a different orientation distribution between at least two layers and a novel process for forming oriented multi-layer films having a different orientation distribution between the layers. An important feature is the formation of a first tubular layer which is folded and fed into the interior of a second tubular layer of smaller diameter. Upon inflation of the inner tubular layer of larger diameter to its maximum unstretched diameter the smaller diameter outer tubular layer will be stretched and will also be oriented if the stretching occurs while the temperature of the smaller diameter outer tubular layer is maintained within the orientation temperature range of that material.

8 Claims, 1 Drawing Figure

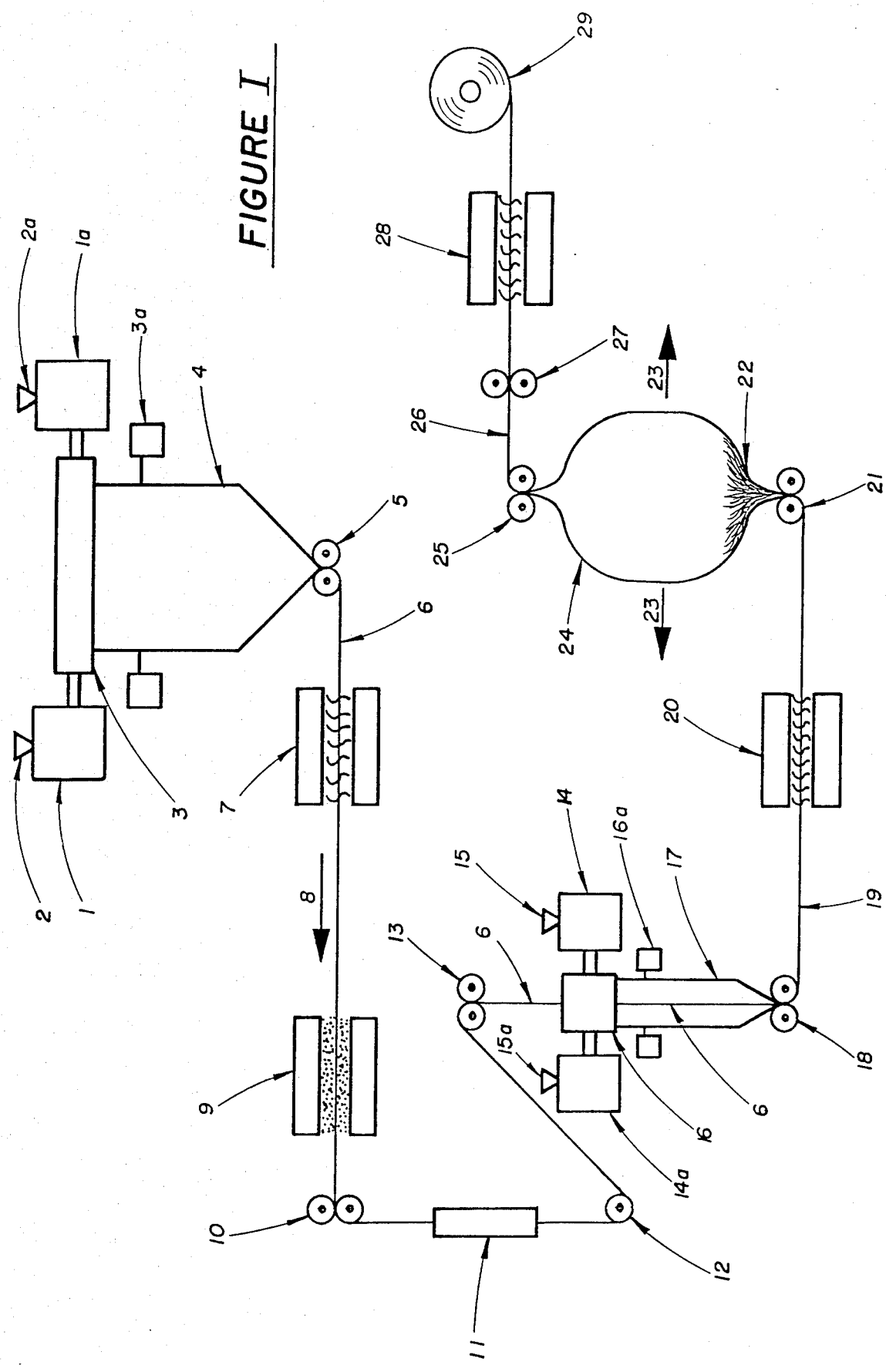
FIGURE I

PROCESS FOR FORMING ORIENTED MULTI-LAYER FILMS HAVING A DIFFERENT ORIENTATION DISTRIBUTION BETWEEN LAYERS

This is a division of application Ser. No. 406,590, filed Aug. 9, 1982, now U.S. Pat. No. 4,442,147 issued Apr. 10, 1984.

FIELD OF THE INVENTION

The present invention relates to film formation and, more particularly, to a method for forming an oriented multi-layer film having a different direction of orientation between at least two of the layers of the film.

BACKGROUND OF THE INVENTION

For many years it has been known that the stretching of an orientable thermoplastic material under certain conditions, now well known in the art, would result in the orientation, i.e. alignment, of the molecules of the material in the direction of stretching. One method whereby this stretching may be accomplished is known as the "bubble" process.

The bubble process is a well known process for forming an oriented thermoplastic film wherein an extruded tube of thermoplastic material which is heated to its orientation temperature range is sequentially inflated and stretched by internal pressure, cooled and then collapsed into a lay-flat configuration. The collapsed tube may subsequently be wound up in roll fashion for storage. The tube may be cut or slit to form a planer film. The tube is usually extruded vertically. After extrusion a volume of air is trapped within the tube. The internally trapped air causes the extruded tubing to assume a bubble or balloon-like configuration so as to enlarge, stretch and orient the tube in both the transverse and longitudinal directions. The bubble may be formed through utilization of two sets of pinch rolls which may also serve to collapse the tube and form a lay-flat film. The thickness of the film may, to some degree, be controlled by varying the volume of the internally trapped air and hence the degree of enlarging and stretching, by varying the rate of extrusion and/or varying the speed of revolution of the pinch rolls which collapse the tube into lay-flat configuration.

The terms "oriented" and/or "orientation" are used herein to describe the process and resultant product characteristics obtained by stretching a resinous orientable polymeric thermoplastic material which has been heated to within its orientation temperature range and then cooled in order to lock-in or "freeze" the molecular alignment of the material in the direction of stretching. This action improves the mechanical properties of the film, such as, for example, shrink tension and orientation release stress. Both of these properties may be measured in accordance with ASTM D 2838 69 (reapproved 1975). The orientation temperature range for a given film will vary with the different resinous thermoplastic materials or blends thereof which comprise the film. However, the orientation temperature range may generally be stated to be above room temperature and below the melting point of the thermoplastic material or blend of materials. Orientation temperature ranges for the materials encompassed by the present invention are well known to those skilled in the art. When the stretching force is applied in one direction uniaxial orientation results. When the stretching force is applied in two directions biaxial orientation results.

The term "cross-oriented" is used herein to describe a multilayer film comprising two or more layers in which at least two of the layers are oriented at an angle with respect to each other.

The terms "polymer" and "polymeric" are used herein to include polymers, ionomers, copolymers, interpolymers, homopolymers, block or graft polymers and blends thereof.

Other methods of stretching are known in the art. For example, it has been recognized in the art that the extruded tubing may be longitudinally stretched by revolving the pinch rolls which initially collapse the tubing after extrusion at a rate in excess of the linear velocity with which the tubing emerges from the extrusion die. If the temperature of the extruded tubing is maintained within its orientation temperature range during the stretching, the molecules of the tubing will be oriented in the direction of stretching. Films manufactured by this method are generally referred to as hot stretched. It has also been recognized in the art that the extruded tubing may be longitudinally stretched by revolving one of the pairs of pinch rolls which transport a tubular extrudate, which has been extruded, cooled and reheated to its orientation temperature range, at a rate in excess of the rate of revolution of a preceding pair of pinch rolls. Films manufactured by this method are generally referred to as cold stretched films. Either of these methods accomplishes some degree of orientation of the stretched tubular extruded film in the longitudinal or tubular direction. However, if a high degree of orientation is desired the later procedure should be followed since it results in a greater degree of orientation. Furthermore, it is also well known that the transverse expansion of an extruded tubular film, which is heated to a temperature within its orientation temperature range results in the stretching and consequent orientation of the tubular extruded film in the transverse or lateral direction. A greater degree of transverse orientation occurs if the extruded material is first cooled and then reheated to its orientation temperature range (i.e. cold stretched) prior to being subjected to transverse stretching and expansion. If the transverse stretching is coupled with longitudinal stretching, as is the case in the bubble process, a biaxial orientation is imparted to the resultant extruded film.

Stretching to orient a thermoplastic material is widely utilized within the art since it is well known that an oriented material exhibits increased tear resistance in the direction transverse to the direction of stretching and orientation. Further discussion of film orientation may be found at Volume I, Chapter 10 of *The Science and Technology of Films*, copyrighted in 1968 by John Wiley and Sons. The book was edited by Orville J. Sweeting and is hereby incorporated by reference.

It is also previously known to prepare a multi-layer plastic film by means of two or more extruders, a die with several concentric annular extrusion slots, bubble stretching apparatus and/or longitudinal stretching or drawing apparatus. The materials which form the layers of said plastic film are separately prepared and processed in the different extruders and then are passed separately to the different concentric extrusion slots of the die. The diameters of the concentric die slots are very close to each other. Thus, the emerging tubes which form the different layers of the final film make contact with each other shortly before or after emerging from the die and are stretched and oriented only after being united with each other. Such action means that the individual layers cannot be independently stretched and oriented. Thus all layers of the extruded film must have the same direction of orientation.

The present invention relates to a new continuous process by means of which it is possible to prepare a multi-layer film having a different orientation distribution between the film layers. In a preferred embodiment, the present invention comprises a film whereby an interior layer of the extruded tubular structure is predominantly oriented in the longitudinal direction and an exterior layer of the extruded tubular structure is predominately transversely oriented. The thus formed cross-oriented tubing has improved strength and high tear resistance.

Other individuals have worked in this area and, indeed, have received patents on cross-oriented films and methods for producing them. For example, the work of Reifenhauser et al. has resulted in U.S. Pat. Nos. 3,726,743 and 3,926,706. Additionally, the work of Kubat et al. resulted in U.S. Pat. No. 4,076,568. While these patents do disclose methods for producing cross-oriented films and cross-oriented film products, the apparatus, processes and products disclosed in these patents are distinguishable from those of the present invention in that the above-identified patents generally disclose much more complex apparatus whereby the tubular layers are independently extruded or coextruded and the various cross-orientations are regulated by varying the pressure of the air injected into the inner tube and/or injected between the inner and outer tubes, or both. Thus, it can be seen, prior to the present invention, the need existed for a much more simple and more readily controllable process to produce oriented multi-layer films having a different orientation distribution between the layers of the film.

SUMMARY OF THE INVENTION

The present invention has overcome the shortcomings of the above-discussed prior art processes by forming a first tubular layer of a given diameter and folding the structure so that it may be fed into the interior of a smaller diameter second tubular layer. If necessary, the exterior surface of the larger diameter inner tubular layer may be dusted or otherwise lubricated prior to folding to assure that the exterior surface of the inner tubular layer may readily slip over the interior surface of the outer tubular layer when the tubes are expanded to the maximum non-stretched diameter of the larger diameter inner tube. Since the non-stretched diameter of the smaller diameter outer tubular layer is less than the non-stretched diameter of the larger diameter inner tubular layer, expansion of the larger inner tubular layer to its maximum nonstretched diameter results in the stretching and orientation of the smaller diameter outer tubular layer if such expansion occurs while the temperature of the smaller diameter outer tubular layer is maintained within its orientation temperature range. As stated previously, the orientation temperature ranges for thermoplastic materials encompassed by the present invention are well known to those skilled in the art. Since the larger diameter inner tubular layer is not stretched, this layer will not be oriented. Accordingly, one embodiment of the present invention results in a multi-layer film which has an unoriented inner layer and an oriented outer layer. Other embodiments with other combinations of different orientation distributions between the layers are hereinafter disclosed. Moreover, the need for complex dies and multiple air sources which must be precisely controlled has been eliminated.

OBJECTS OF THE PRESENT INVENTION

It is an object of the present invention to provide a process for forming an oriented multi-layer film wherein the aforementioned disadvantages are obviated.

Another object of the present invention is to provide a process for producing oriented multi-layer films having a very different orientation distribution between the film layers.

It is also an object of the present invention to provide a more simple and easily controllable process for producing cross-oriented films.

Yet another object of the present invention is to provide oriented multi-layer films comprising layers having different mechanical properties.

A further object of the present invention is to provide oriented multi-layer films having a very different orientation distribution between the film layers.

Still further objects and the broad scope of applicability of the present invention will become apparent to those of ordinary skill in the art from the details disclosed hereinafter. However, it should be understood that the following detailed description which indicates a presently preferred embodiment of the invention is only given for purposes of illustration since various changes and modifications well within the spirit and scope of the present invention will become apparent to those of ordinary skill in the art from this detailed description.

BRIEF DESCRIPTION OF THE DRAWING

FIG. 1 is a schematic representation of a preferred embodiment of an inventive process of the present invention.

DETAILED DESCRIPTION OF THE INVENTION AND A PERFERRED EMBODIMENT

Turning now to FIG. 1 which is a schematic representation of a preferred embodiment of the present inventive process, it can be seen that, intitially, a first tubular layer 4 is extruded from die 3. The raw materials to form the extruded tubular layer 4 are fed into extruder 1 by way of hopper 2. Tubular layer 4, for reasons which will become apparent, comprises a polymeric material having a high melting point, preferrably between 300° F. and 600° F. This melting point range is not to be taken as absolute or limiting since the importance of the high melting point lies not in the range but rather in the fact that the melting point of the material of first tubular layer 4 is to be substantially greater than the orientation temperature range of the material of second tubular layer 17, hereinafter discussed. Thus, the selection of a material having a very low orientation temperature range for the material of second tubular layer 17 will broaden the materials utilizable for first tubular layer 4. Accordingly, from the above, it should be recognized that the present invention is not directed to utilization of any single material but rather to pairs of materials wherein the melting point of one material, e.g. 4, is substantially higher than the orientation temperature range of the second material, e.g. 17.

The term "substantially higher" as used herein is meant to encompass all situations where the first, high melting point material will not be tacky or self-adherent at the orientation temperature range of the second material.

Preferred materials for first tubular layer 4 include the polyethylenes and also the polyamide polymers, e.g. nylon 66 and nylon 6. Other useful materials include unsaturated ester copolymers such as ethylene/unsaturated ester copolymers, e.g., ethylene/vinyl acetate copolymers, and polypropylene polymers. Those skilled in the art will readily recognize that numerous other materials may be utilized.

After extrusion the first tubular layer 4 is cooled, by quenching means 3a well known in the art before the tubular layer 4 can internally adhere or weld. Tubular layer 4 is then collapsed by deflate pinch rolls 5 into a lay-flat configuration as at 6. The thus formed lay-flat tubing could, optionally, be irradiated, as is well known in the art, at this point if cross-linking of this layer was desired.

The lay-flat configuration 6, for reasons which will hereinafter become clear, should have an unstretched width or diameter essentially equivalent to that of the final width desired of the finished product. Prior to passing the lay-flat configuration through transfer rolls 10 the outer surface of the configuration is dusted or otherwise lubricated at 9 with a non-tacky material such as corn starch or silica. After passing through transfer rolls 10, the lay-flat configuration 6 is longitudinally folded (e.g. folded in the machine or tubular direction) by folder 11 and transported by transfer rolls 12 and 13 so as to pass through a second die 16.

Second die 16 extrudes an orientable thermoplastic material as a second tubular layer 17 over the folded lay-flat tubing 6 so that the folded lay-flat tubing 6 passes down into the exteriorily extruded tube 17 formed by die 16. As stated above, an important feature in the selection of the material to be utilized for second tubular layer 17 is that the orientation temperature range of this material should be substantially lower than the melting point of the material utilized to form first tubular layer 4. Additionally, the temperature at which the material utilized for first layer 4 becomes tacky or self-adherent should be substantially higher than the temperature at which the material utilized for second tubular layer 17 becomes tacky or self-adherent. Thus, the selection of a material for second tubular layer 17 depends, to some extent, on the material selected for first tubular layer 4. The orientation temperature range of the second tubular layer 17 should be substantially lower than the melting point of the material utilized for first tubular layer 4 so as to avoid any adhesion of the inner surface of first tubular layer 4 to itself upon the subsequent orientation of outer tubular layer 17. Examples of orientable thermoplastic materials which may be utilized are polymers and polymeric blends of the following monomers: the mono-olefins and conjugated di-olefins, e.g. ethylene, propylene, butene-1, isobutene, 1, 3 butadiene, isoprene and other aliphatic mono and diolefins; the halogen substituted olefins, e.g. vinyl chloride, vinylidene chloride; the mono/vinylidene aromatic compounds, e.g. styrene, alpha methylstyrene, chlorostyrene, other aromatic olefins; and other ethylinically unsaturated monomers such as acryonitrile, acrylamide and the like. Polyamide polymers, e.g. nylon 66 and nylon 6, may also be utilized. A preferred orientable thermoplastic material is a copolymer of ethylene and methyl acrylate. Another preferred material is marketed under the tradename of "plexar". Plexar is commercially available from the Chemplex Co. and several plexar variants are described in U.S. Pat. Nos. 4,087,587; 4,087,588 and 4,303,711, all hereby incorporated by reference. One plexar variant, plexar 2, may be characterized as blends of a graft copolymer of a high density polyethylene and at least one unsaturated, fused ring, carboxylic acid anhydride and this blended with one or more resin copolymers of ethylene and an ethylinically unsaturated ester. Another variant, plexar 3, generally comprises blends of a graft copolymer of a high density polyethylene and at least one unsatruated, fused ring, carboxylic acid anhydride blended with a polyethylene resin of one or more homopolymers of ethylene, copolymers of ethylene and an alpla-olefin or any or all of these. Of course, die 16 is provided with appropriate orientable material by extruder 14 from hopper 15. As illustrated in FIG. 1, the extruded non-stretched diameter of the second tubular layer 17 is smaller than the extruded non-stretched diameter of the first tubular layer 4.

A second set of deflate pinch rolls 18 collapses the outer tube 17 after it has been quenched and cooled by means well known in the art, as at 16a, before it can internally weld or adhere to the interiorily folded lay-flat tubing 6. This action results in the formation of a lay-flat tube within a lay-flat tube as at 19. Yet another alternative to the earlier referenced optional irradiation step, irradiation of the entire structure, could optionally be performed at this point when the structure comprises a lay-flat tube within a lay-flat tube as at 19. Such action would be applicable if cross-linking of all layers was desired.

The composite collapsed lay-flat inner and outer tubular layers 19 is then heated to the orientation temperature range of outer tubular layer 17 by heating element 20. As stated above, this temperature is substantially less than the melting point of inner tubular layer 4. The composite is then passed through pinch rolls 21 whereafter the inner folded tubular layer 4 is reinflated to its maximum non-stretched diameter. The lubricating dust or other material, for example corn starch or silica, provided by duster 9 assists the outer surface of inner tubular layer 4 in easily sliding over the inner surface of the outer tubular layer 17. As stated above outer tubular layer 17 has a maximum extruded non-stretched diameter which is less than that of inner tubular layer 4. Thus, when inner tubular layer 4 is reinflated to its maximum non-stretched diameter as in the direction of arrows 23 to form bubble 24 the outer tubular layer 17 which is heated to within its orientation temperature range will be stretched and oriented by the inflation of larger inner tubular layer 4. The stretching and orientation of outer tubular layer 17 will be substantially in the transverse direction as illustrated by arrows 23. A small degree of longitudinal stretching and orientation will also be present. Thus, the orientation of outer tubular layer 17 could be stated to be biaxial. However, since the degree of longitudinal orientation is slight, the preferred descriptive terminology is "substantially transversely" oriented.

Bubble 24 may be collapsed through utilization of deflate pinch rolls 25 into a lay-flat configuration as at 26. Thereafter, the collasped lay-flat tubing within a tubing may be passed through heated nip rolls 27, or alternatively, through heating unit 28, whereby the tubular layers are brought into intimate heated and pressurized contact with each other and the tubes are joined together. The temperature of heated nip rolls 27 or heating unit 28 is adjusted so that the outer lower melting point tubular layer 17 is rendered tacky. Since, as previously stated, the melting point of inner tubular layer 4 is much higher than the temperature at which outer tubular layer becomes tacky, the inner surface of inner tubular layer 4 does not adhere to itself when the outer layer is adhered to the inner layer by heated nip rolls 27 or heating unit 28. Thereafter, the final product which is a multi-layer tubular structure may be stored as at 29. Optionally, depending on end use, the multi-layer tubular structure may be slit to form a planer film.

Since the extruded inner tubular layer 4 is only inflated to its maximum non-stretched diameter, the inner layer of the composite final product, in this embodiment, will not be oriented. Moreover, since the expansion of inner tubular layer 4 results in outer layer 17 being predominantly stretched in the lateral or transverse direction, outer layer 17 will be predominantly oriented in the lateral or transverse direction. From the above it can be seen that this embodiment of the present invention will comprise a seamless multi-layer tubular structure having a substantially unoriented inner layer and a substantially transversely oriented outer layer. Thus, the multi-layer tubular structure will have a different orientation distribution between at least two layers.

Numerous modifications and alterations of the present invention will be readily apparent to those skilled in the art upon review of the above disclosure. For instance, an orientable material may be utlized for inner tubular layer 4. In this embodiment, the orientable material selected for first tubular layer 4 should have an orientation temperature range which is higher than the orientation temperature range of second tubular layer 17 so that the subsequent orientation of second tubular layer 17 will not affect the orientation of first tubular layer 4. In this embodiment first tubular layer may be heated by optional heating element 7 to its orientation temperature range and stretched longitudinally to effect the longitudinal orientation of inner tubular layer 4. The longitudinal stretching and orientation may be accomplished by revolving transfer rolls 10 at a higher rate of speed than the rate of passage of tubular layer 4 through deflate pinch rolls 5. Preferred ratios of such longitudinal stretching are from 2 to 1 to 16 to 1 in the direction of arrow 8. If the remainder of the process is carried out as discussed above the inner larger diameter, tubular layer 4 will be oriented substantially in the longitudinal direction whereas the outer, smaller diameter, tubular layer 17 will be oriented substantially in the lateral or transverse direction. Upon collapse of these tubular layers at 26 and their subsequent joining by means 27 or 28 those skilled in the art will recognize that the final film product of this embodiment will comprise a multi-layer tubular film having a longitudinally oriented inner layer and a transversely oriented outer layer. In other words the layers will be cross-oriented. Thus, this multi-layer tubular film will also have a very different orientation distribution between at least two layers.

Still further modifications of the present invention are possible in that the inner tubular layer 4 and the outer tubular layer 17 could each comprise two or more plies of different materials. The additional plies of each layer could be formed, in each case, through utilization of coextrusion techniques well known in the art. In this embodiment, the above-discussed method would be modified by addition of extruders 1a and 14a which are provided with hoppers 2a and 15a if each layer were to be composed of two plies. Of course, additional extruders and hoppers could be utilized if even more plies were desired. In this multi-layer, multiply embodiment extrusion dies 3 and 16 would be replaced with appropriate coextrusion dies which are well known in the art.

In addition to the two layered structure discussed above, additional layers could be provided as is well known in the art through utilization of additional dies and/or laminating techniques. In this embodiment the inner and outer layers having a different orientation distribution would not necessarily be the innermost or outermost layers of the final multi-layer structure.

From the above discussion it is readily apparent that through utilization of the present invention both the composition and the orientation characteristics of a film may be readily and easily varied and tailored to effectuate the desired final film characteristics.

What is claimed is:

1. A process for forming a multi-layer film having a different orientation distribution between the layers thereof comprising:
   extruding a first tubular layer having a first non-stretched diameter;
   longitudinally folding said first tubular layer;
   extruding a second tubular layer of an orientable thermoplastic material, having a second non-stretched diameter, about said first folded tubular layer wherein said second non-stretched diameter is less than said first non-stretched diameter;
   inflating said first tubular layer to no more than said first non-stretched diameter;
   whereby said second tubular layer is stretched and oriented by the inflation of said first tubular layer.

2. The process of claim 1, wherein said first tubular layer is oriented prior to folding.

3. The process of claim 1, wherein said first tubular layer is lubricated prior to folding.

4. The process of claim 1, wherein at least one of said extrusion steps comprises coextruding a multi-ply tubular layer.

5. The process of claim 2, wherein said first tubular layer is longitudinally oriented prior to folding.

6. The process of claim 3, wherein said lubrication is accomplished by dusting.

7. The process of claim 5, wherein said first tubular layer is longitudinally stretched to orient at a ratio from 2 to 1 to 16 to 1.

8. The process of claim 6, wherein said dusting is accomplished by application of a material selected from the group of corn starch or silica.

* * * * *